(12) United States Patent
Castelain et al.

(10) Patent No.: US 10,756,941 B1
(45) Date of Patent: Aug. 25, 2020

(54) METHOD AND DEVICE FOR PERFORMING CHANNEL ESTIMATION

(71) Applicant: MITSUBISHI ELECTRIC CORPORATION, Tokyo (JP)

(72) Inventors: Damien Castelain, Rennes (FR); Yuji Matsuki, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 87 days.

(21) Appl. No.: 16/305,265

(22) PCT Filed: Jul. 6, 2017

(86) PCT No.: PCT/JP2017/025470
§ 371 (c)(1),
(2) Date: Nov. 28, 2018

(87) PCT Pub. No.: WO2018/012560
PCT Pub. Date: Jan. 18, 2018

(30) Foreign Application Priority Data

Jul. 12, 2016 (EP) .................................... 16179086

(51) Int. Cl.
*H04L 27/26* (2006.01)
*H04L 27/01* (2006.01)
*H04J 11/00* (2006.01)

(52) U.S. Cl.
CPC ...... *H04L 27/2695* (2013.01); *H04J 11/0023* (2013.01); *H04L 27/01* (2013.01); *H04L 27/2649* (2013.01)

(58) Field of Classification Search
CPC . H04L 27/2695; H04L 27/01; H04L 27/2649; H04J 11/0023
See application file for complete search history.

(56) References Cited

U.S. PATENT DOCUMENTS

2004/0013171 A1* 1/2004 Pan ...................... H04L 25/0212
375/147
2005/0135324 A1* 6/2005 Kim ........................ H04L 1/005
370/343

(Continued)

OTHER PUBLICATIONS

International Search Report (PCT/ISA/210) issued in PCT/JP2017/025470, dated Oct. 12, 2017.

*Primary Examiner* — Jaison Joseph
(74) *Attorney, Agent, or Firm* — Birch, Stewart, Kolasch & Birch, LLP

(57) ABSTRACT

The method:
    extracts symbols at pilot positions from the received stream of symbols,
    estimates noise variances at pilot positions,
    determines a rough channel estimation from the symbols extracted at pilot positions,
    determines weighting coefficients from the estimated noise variances,
    weights the rough channel estimation by the determined weighting coefficients,
    filters the weighted rough channel estimation using predetermined coefficients, at least one predetermined coefficient being different from the other predetermined coefficients, the predetermined coefficients being determined for a constant noise variance,
    determines normalization coefficients from the determined weighting coefficients and predetermined filter coefficients,
    normalizes the filtered weighted rough channel estimation using the determined normalization coefficients.

13 Claims, 4 Drawing Sheets

(56) References Cited

U.S. PATENT DOCUMENTS

2006/0062322 A1* 3/2006 Namgoong .......... H04B 1/1027
                                               375/285
2006/0209979 A1* 9/2006 Sandell ............... H04L 27/2675
                                               375/267
2012/0213261 A1* 8/2012 Sayana ................ H04L 5/0094
                                               375/224

* cited by examiner

METHOD AND DEVICE FOR PERFORMING CHANNEL ESTIMATION

TECHNICAL FIELD

The present invention relates generally to a method and a device for performing a channel estimation of a channel between a source and a receiver.

BACKGROUND ART

In wireless telecommunication, either terrestrial or satellite communications, channel estimation is classically performed from pilots symbols, the received pilots experiencing different signal-to-noise ratios in some situations.

SUMMARY OF INVENTION

Technical Problem

In systems whose demodulation is performed in the frequency domain, as OFDM, SC-OFDM and SC-FDMA, the transmission may suffer a coloured noise, i.e. a noise with a frequency-dependent variance.

This frequency dependence of the noise can be due to narrow-band interferers, or adjacent interferers, or any kind of interferers.

Classically, such channel estimation is generally based on received pilots, and includes a noise reduction and interpolation filter, that takes into account the channel correlation on pilot positions. The noise reduction and interpolation filter depends on the signal-to-noise ratios affecting the received pilots symbols. Solutions exist like for example MMSE/Wiener filter for calculating such filters. However, the resulting filter coefficient calculation is rather complex and shall be performed in real time as the coloured noise variances cannot be known in advance.

Solution to Problem

The present invention aims at providing a method and a device which enable to reduce the complexity of such filter coefficient calculation while keeping good channel estimation performances.

To that end, the present invention concerns a method for performing a channel estimation of a channel between a source and a receiver, a noise with a frequency-dependent variance being added to the stream of symbols received by the receiver from the source through the channel, the receiver performing a demodulation in the frequency domain, characterized in that the method comprises the steps of:

extracting symbols at pilot positions from the received stream of symbols,
estimating noise variances at pilot positions,
determining a rough channel estimation from the symbols extracted at pilot positions,
determining weighting coefficients from the estimated noise variances,
weighting the rough channel estimation by the determined weighting coefficients,
filtering the weighted rough channel estimation using predetermined coefficients, at least one predetermined coefficient being different from the other predetermined coefficients, the predetermined coefficients being determined for a constant noise variance,
determining normalization coefficients from the determined weighting coefficients and predetermined filter coefficients,
normalizing the filtered weighted rough channel estimation using the determined normalization coefficients.

The present invention also concerns a device for performing a channel estimation of a channel between a source and a receiver, a noise with a frequency-dependent variance being added to the stream of symbols received by the receiver from the source through the channel, the receiver performing a demodulation in the frequency domain, characterized in that the device comprises:

means for extracting symbols at pilot positions from the received stream of symbols,
means for estimating noise variances at pilot positions,
means for determining a rough channel estimation from the symbols extracted at pilot positions,
means for determining weighting coefficients from the estimated noise variances,
means for weighting the rough channel estimation by the determined weighting coefficients,
means for filtering the weighted rough channel estimation using predetermined coefficients, at least one predetermined coefficient being different from the other predetermined coefficients, the predetermined coefficients being determined for a constant noise variance,
means for determining normalization coefficients from the determined weighting coefficients and predetermined filter coefficients,
means for normalizing the filtered weighted rough channel estimation using the determined normalization coefficients.

Thus, channel estimation is improved with respect to a simple filtering using predetermined coefficients for a constant noise variance only, with a low complexity in comparison to a real time calculation of an optimal filter.

According to a particular feature, the method further comprises the step of equalizing the channel using the demodulated symbols, the noise power estimation and the normalized filtered weighted rough channel estimation.

Thus, the demodulation is improved because the channel estimation is improved, and the global performance is improved.

According to a particular feature, the weighting coefficients are equal to $$\omega_k = \frac{\sigma_b^2}{\sigma_k^2},$$

k is the pilot position index, $\sigma_k^2$ is the noise plus interferer variance for pilot position index k and $\sigma_b^2$ a constant noise variance.

Thus, the weighted coefficients are simply determined and insured that highly affected pilots do not affect too much channel estimation at other positions.

According to a particular feature, the predetermined coefficients $a_{ik}$ are grouped under the form of a predetermined matrix $A_{basic}$ and in that the matrix is determined as:

$$A_{basic} = \left( \sum_h^{-1} + \frac{1}{\sigma_b^2} I \right)^{-1} \frac{1}{\sigma_b^2}$$

Where $\Sigma_{(.)}$ represent the correlation matrix of a channel vector, I is the identity matrix.

Thus, the basic matrix is optimised for a non-coloured noise and the pilot estimation scheme is optimal in case the noise is not coloured, for example when there is no interferer.

According to a particular feature, the normalization coefficients $\lambda_i$ are determined as:

$$\lambda_i = \frac{\mu_i}{\sum_k a_{ik} \omega_k}$$

Where i is the index of the i-th output of the filtering and $\mu_i$ is a predetermined value or is the sum of the coefficients $a_{ik}$.

Thus, the normalisation coefficients are simply determined and insured that the resulted channel estimates have an average energy close to the optimal one.

According to a particular feature, plural predetermined matrices are memorized and the method further comprises the step of selecting one of the plural predetermined matrices according to the estimated noise variances and/or according to the estimation of a parameter related to the correlation matrix of the channel vector $\Sigma_h$.

Thus, the channel estimation process is further improved, the basic predetermined filter being closer to the optimal one.

According to a particular feature, the demodulation is an OFDM or SC-FDMA or SC-OFDM demodulation.

Thus, the demodulation is usually performed in the frequency domain, and no complexity is added by transforming the signal to the frequency domain.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings.

DESCRIPTION OF EMBODIMENTS

Figure 1:
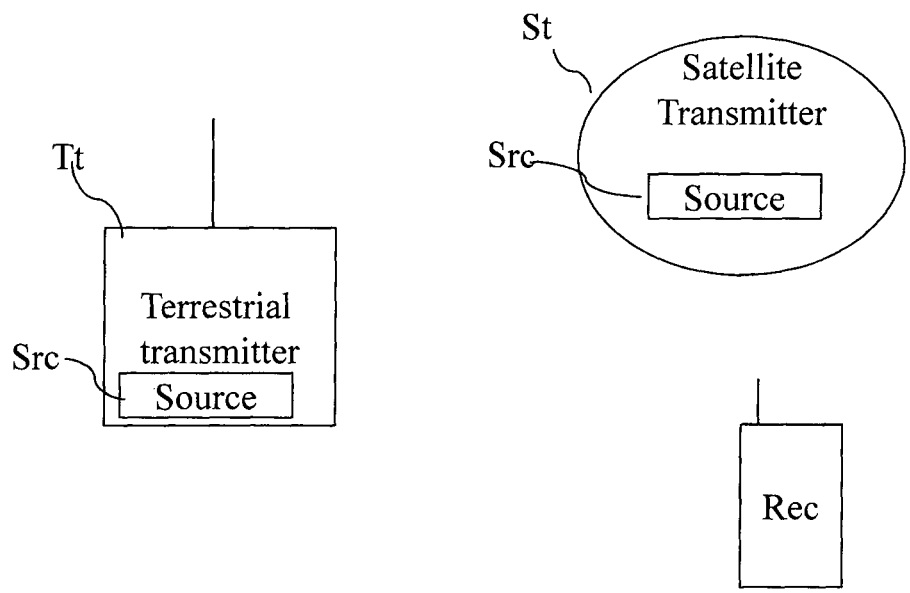
FIG. 1 represents a wireless system in which the present invention is implemented.

FIG. 1 represents a wireless system in which the present invention is implemented.

The present invention will be disclosed in an example in which the signals transferred by a source Src are transmitted to receivers Rec. A source Src may be included in a satellite St or in a terrestrial transmitter Tt.

Only one satellite St and one terrestrial transmitter St are shown in the FIG. 1 for the sake of simplicity, but the wireless link may comprise a more important number of satellites St and/or of terrestrial transmitters St.

The satellite St may broadcast signals or perform satellite communication as disclosed in the Digital Video Broadcasting Next Generation Broadcasting system to handheld physical layer specification (DVB NGH), DVB document A160 published in November 2012.

The terrestrial transmitter Tt may be a base station of a wireless cellular telecommunication network that complies with the specification 3GPP TSG-RAN, "TR 25.814: "Physical Layer Aspects for Evolved UTRA", Version 7.1.0, 2006-September.

The invention can be applied to modulations as SC-FDMA, SC-OFDM and OFDM, for broadcasting or for classical communications.

Only one receiver Rec is shown in the FIG. 1 for the sake of simplicity, but signals are broadcasted or transmitted to a more important number of receivers Rec.

The receiver Rec may be a mobile terminal.

According to the invention, the receiver Rec:

extracts symbols at pilot positions from the received stream of symbols, estimates noise variances at pilot positions, determines a rough channel estimation from the symbols extracted at pilot positions, determines weighting coefficients from the estimated noise variances, weights the rough channel estimation by the determined weighting coefficients, filters the weighted rough channel estimation using predetermined coefficients, at least one predetermined coefficient being different from the other predetermined coefficients, the predetermined coefficients being determined for a constant noise variance, determines normalization coefficients from the determined weighting coefficients and predetermined filter coefficients, normalizes the filtered weighted rough channel estimation using the determined normalization coefficients.

Figure 2:
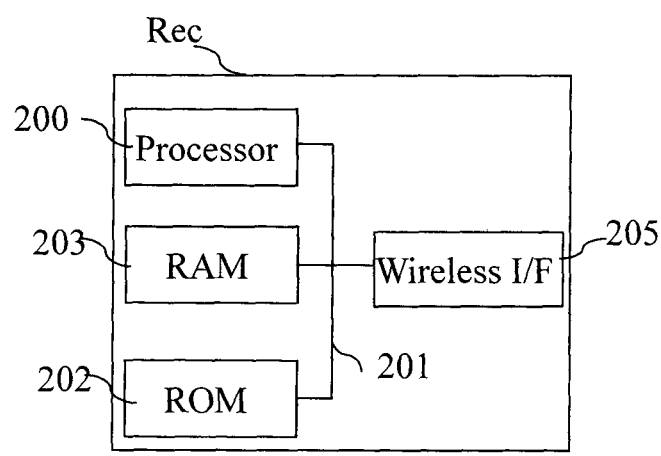
FIG. 2 is a diagram representing the architecture of a receiver in which the present invention is implemented.

FIG. 2 is a diagram representing the architecture of a receiver in which the present invention is implemented.

Figure 4:
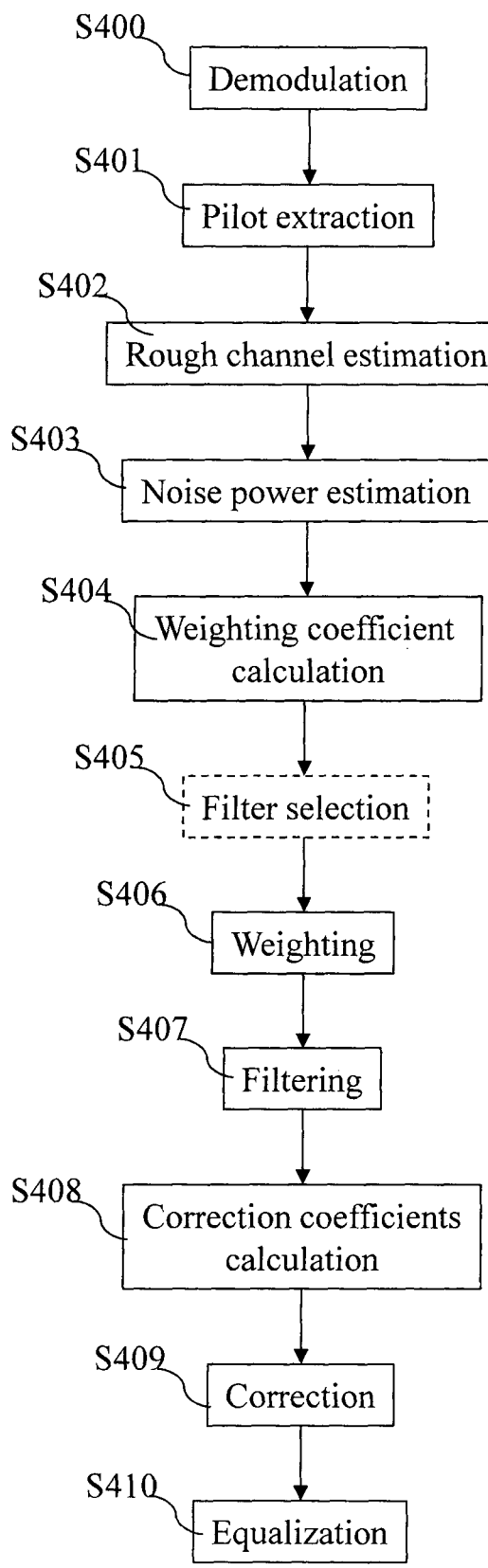
FIG. 4 discloses an example of an algorithm executed by a receiver according to the present invention.

The receiver Rec has, for example, an architecture based on components connected together by a bus 201 and a processor 200 controlled by the program as disclosed in FIG. 4.

It has to be noted here that the receiver Rec may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 4.

The processor 200 controls the operation of the wireless interface 205.

The read only memory 202 contains instructions of the program related to the algorithm as disclosed in FIG. 4, which are transferred, when the receiver Rec is powered on, to the random access memory 203.

The wireless interface 205 comprises means for performing a reliable channel estimation performed from pilots wherein the received pilots experience different signal-to-noise ratios.

For example, the present invention concerns systems whose demodulation is performed in the frequency domain, as OFDM and SC-FDMA (SC-OFDM), the transmission suffering a coloured noise, i.e. a noise with a frequency-dependent variance.

This frequency dependence of the noise can be due to narrow-band interferers, or adjacent interferers, or any kind of interferers.

Classically, as disclosed in the PhD report of Stefan Kaiser, January 1998, Munich, Multi-Carrier CDMA Mobile Radio Systems—Analysis and Optimization of Detection, Decoding and Channel Estimation, some channel estimation schemes assume that noise variance is constant. This simple approach allows to pre-calculate the filter coefficients, assuming a typical fixed noise variance, and therefore avoids a real time calculation.

Another approach, for example as disclosed in the paper of Chang-Yi Yang et Bor-sen Chen published in Eurasip Journal on Advanced Signal Processing, Volume 2010 and entitled "Adaptive Channel-Tracking Method and Equalization for MC-CDMA Systems over Rapidly Fading Channel under Colored Noise", is to directly design filters that minimize the Minimum Mean Square Error (MMSE) criterion. This approach has the advantage to take into account the fact that the noise may be coloured, i.e. that the variance depends on index k.

If we represent the filtering by a direct estimation of the channel vector $\underline{h}=(h_k)$, the filtering (estimation of $\underline{h}$) corresponds to the multiplication by a matrix A:

$$\underline{\tilde{h}}=A\underline{g}$$

where $\underline{g}$ is a rough channel estimation, obtained at pilot positions, prior to noise filtering.

Then, defining A according to the MMSE criteria corresponds to select A as:

$$A_0=\arg\min_A(\Sigma|\underline{h}-A\underline{g}|^2)$$

The corresponding general MMSE solution is known to be:

$$A = \sum_h \sum_g^{-1}$$

Where $\Sigma_{(.)}$ represents the correlation matrices: $\Sigma_x=E(xx^H)$ and where $x^H$ represents the complex conjugate of vector x.

By assuming independence of the noise and channel h, we get:

$$A=\Sigma_h(\Sigma_h+\Sigma_n)^{-1}$$

The channel correlation matrix $\Sigma_h$ depends on the system design, in particular pilot positions, and on some channel characteristics like for example the delay spread. We assume in the following that this channel correlation matrix is known. For example, classically, the delay spread of the channel is assumed equal to the cyclic prefix duration for OFDM, SC-OFDM or SC-FDMA systems.

By assuming that the noise components affecting the different pilots are uncorrelated, we get the noise correlation matrix as:

$$\Sigma_n=\mathrm{Diag}(\sigma_k^2)$$

This approach has a drawback: the filter coefficients must be recalculated for each new noise correlation matrix $\Sigma_n$, and the related complexity is high, especially if the filter size is large. Let us recall that the filter efficiency strongly depends on this size. It may occur that the variance distribution can change relatively rapidly, too fast to allow a real time calculation of the filter coefficients with a low complexity. According to the present invention, the receiver Rec has registered filter coefficients calculated for a constant noise variance $\sigma_b^2$, i.e. without knowledge of the noise variances variation and at least one filter coefficient is different from the other filter coefficients. For example, if a MSE (Mean Square Error) criterion is used, the matrix corresponding to the filter coefficients is equal to:

$$A_{basic}=\Sigma_h(\Sigma_h+\sigma_b^2 I)^{-1}$$

Where I stands for the identity matrix.

Let us assume that $\sigma_b^2$ is less than all $\sigma_k^2$ that corresponds to interferences plus thermal noise. This is for example the case if $\sigma_b^2$ corresponds to the thermal noise variance. Then the variances can be written as:

$$\sigma_k^2=\sigma_b^2+\tilde{\sigma}_k^2$$

If $\sigma_b^2$ corresponds to the thermal noise variance, $\tilde{\sigma}_k^2$ values correspond to interference variances. If not, $\tilde{\sigma}_k^2$ simply corresponds to the differences between the overall variances $\sigma_k^2$ and the predetermined value $\sigma_b^2$ used for calculation of the predetermined filter matrix $A_{basic}$.

Using matrix $A_{basic}$ instead of optimal matrix A corresponds to replace Diag $(\sigma_k^2)$ by Diag $(\sigma_b^2)$ for $\Sigma_n$ in $A=\Sigma_h(\Sigma_h+\Sigma_n)^{-1}$. Strong difference occurs in the resulting coefficients and therefore in the performance.

The matrix A may be rewritten as:

$$A = \left(\sum_h^{-1}+\sum_n^{-1}\right)^{-1}\sum_n^{-1}$$

where:

$$\sum_n^{-1} = \mathrm{Diag}\left(\frac{1}{\sigma_k^2}\right) = \mathrm{Diag}\left(\frac{1}{\sigma_b^2+\tilde{\sigma}_k^2}\right) \simeq \mathrm{Diag}\left(\frac{1}{\sigma_b^2}\right) = \frac{1}{\sigma_b^2}I$$

It has to be noted here that when $\tilde{\sigma}_k^2$ is very large, the approximation $$\frac{1}{\sigma_b^2+\tilde{\sigma}_k^2} \simeq \frac{1}{\sigma_b^2}$$

is less critical than the approximation $\sigma_b^2+\tilde{\sigma}_k^2 \cong \sigma_b^2$.

Moreover, the basic matrix can be rewritten as:

$$A_{basic}=\left(\sum_h^{-1}+\frac{1}{\sigma_b^2}I\right)^{-1}\frac{1}{\sigma_b^2}$$

Therefore, an approximately optimal filter $A_{ap}$ which is the combination of the registered filter coefficients calculated for a constant noise variance $\sigma_b^2$ and coefficients $\omega_k$ calculated according to $\sigma_b^2$ and $\sigma_k^2$, can be expressed as:

$$A_{ap} = \left(\sum_{h}^{-1} + \frac{1}{\sigma_b^2}I\right)^{-1} \text{Diag}\left(\frac{1}{\sigma_k^2}\right) = A_{basic}\text{Diag}\left(\frac{\sigma_b^2}{\sigma_k^2}\right) = A_{basic}\text{Diag}(\omega_k)$$

It has to be noted here that the noise correlation matrix $\Sigma_n$ is approximated in the first part $A_{basic}$ of the expression, not in the second part $\text{Diag}(\omega_k)$.

The fact that the variance is varying is then taken into account, even if partially only, which was not the case when simply replacing A by $A_{basic}$. The present formulation can be interpreted by weighting the vector g, the input of the filter, by the weight coefficients $$\omega_k = \frac{\sigma_b^2}{\sigma_k^2}$$

and then applying the $A_{basic}$ filter.

Some variants exist for the calculation of the weight coefficients $\omega_k$. In the previous derivation, $\sigma_b^2$ is the parameter used for calculation of $A_{basic}$ filter. It can be any other parameter, as the inverse of a typical signal-to-noise ratio, or a low, but not null, a regularisation parameter or a parameter proportional to the average of the $\sigma_k^2$. If the thermal noise variance $\sigma_{th}^2$ and the interferer variances $\breve{\sigma}_k^2$ are estimated, then we can use the weights $$\omega_k = \frac{\sigma_{th}^2}{\sigma_{th}^2 + \breve{\sigma}_k^2}.$$

If the basic filter coefficients are denoted $a_{ik}$ this is equivalent to apply the new weighted filter coefficients equal to:

$$a_{ik}^w = a_{ik}\omega_k$$

Figure 3:
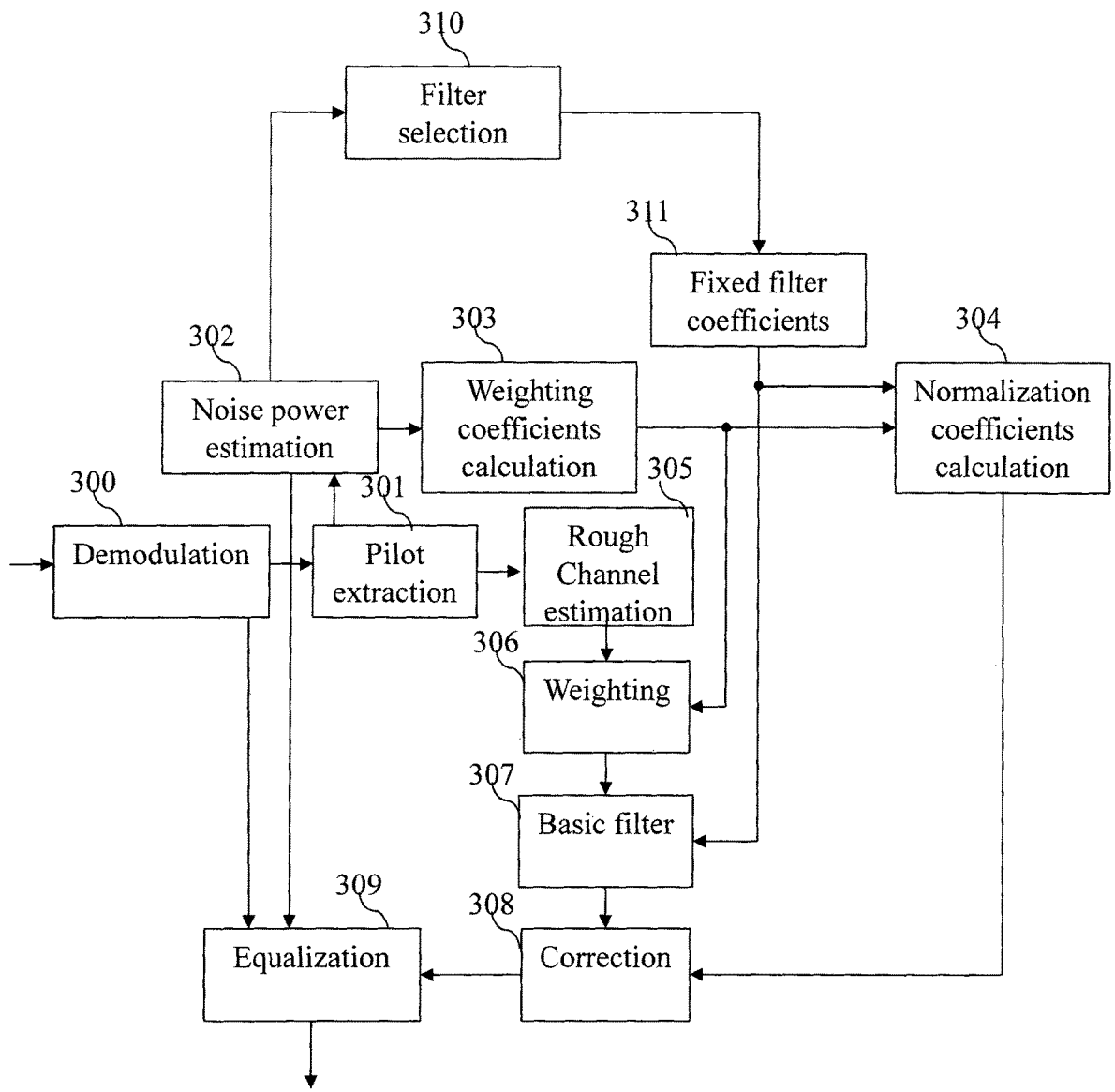
FIG. 3 discloses a block diagram of components of the wireless interface of the receiver.

The wireless interface 205 comprises components as disclosed in FIG. 3.

FIG. 3 discloses a block diagram of components of the wireless interface of the receiver.

The signal received by the receiver Rec is demodulated by a demodulation module 300. For example, the demodulation module 300 performs a Discrete Fourier Transform (DFT) of the received signal.

After demodulation, i.e. in the frequency domain, the received signal in the frequency domain can be represented by:

$$y_k = h_k x_k v_k$$

Where $h_k$ is the channel response for carrier of index k, and where $v_k$ is the additive noise at the same frequency. For example, the term $v_k$ is the addition of the AWGN (thermal) noise and the interferer. Because of the interferer, the variance of the additive noise is frequency-dependent and is denoted by $\sigma_k^2$.

The demodulated signal is provided to a pilot extraction module 301.

The pilot extraction module 301 extracts at pilot positions the corresponding received symbols and provides them to a rough channel estimation module 305.

The rough channel estimation module 305 determines a rough estimation $g_k$ of the channel response $h_k$ at each pilot position k like for example:

$$g_k = \frac{y_k}{p_k}$$

Where k is the pilot position index, $y_k$ is the corresponding received symbol and $p_k$ is the sent pilot value at $k^{th}$ position.

It has to be noted here that this estimation is affected by noise (thermal noise and/or interferers) and only provides estimates at pilot positions. The purpose of the filtering is to reduce the noise and to make interpolation for channel estimation at other positions than pilot positions. The proposed scheme mainly addresses the noise plus interference reduction issue.

The pilot extraction module 301 provides the corresponding received symbols to a noise power estimation module 302.

The noise power estimation module 302 estimates the variances $\sigma_k^2$ of the additive noise. For the simplicity of the presentation, we assume that this estimation is perfect.

The rough channel estimation is modelled as:

$$g_k = h_k + n_k$$

The additive noise $$n_k = \frac{v_k}{p_k}$$

is for example the addition of thermal noise and interference. In the following, and without loss of generality, we assume $E(|P_k|^2) = 1$ Therefore, the additive noise $n_k$ has the same variance $\sigma_k^2$ as $v_k$: $E(|n_k|^2) = \sigma_k^2$ and is assumed to be centred: $E(n_k) = 0$.

The noise power estimation is provided to a weight coefficients calculation module 303.

The weight coefficients module 303 determines the weight coefficients $\omega_k$ as already disclosed.

The weight coefficients are transferred to a weighting module 306 which weights the outputs $g_k$ of the rough channel estimation module 306 by the weight coefficients $\omega_k$.

The output of the weighting module 306 is provided to a filtering module 307 which uses the $A_{basic}$ matrix for filtering the weighted outputs $\omega_k g_k$.

It has to be noted here that the $A_{basic}$ matrix may provide interpolation i.e. performs interpolations between two symbols or blocks of symbols in order to provide more samples.

According to a particular mode of realization of the present invention, the output of the filtering module 307 is provided to a correction module 308.

If some variances $a_k^2$ are high, some weighting coefficients $\omega_k$ may be very low, and the estimates provided by the filtering module 307 have much less energy than the original signal $h_k$ to be estimated. The correction module 308 compensates it by a further correction step, this depending of the weighting coefficients $\omega_k$.

A normalized coefficient calculation module 304, using the weighting coefficients $\omega_k$, determines correction coefficients.

For example, we can multiply each output of index i, where i is the index of the output of the $A_{basic}$ matrix, by:

$$\lambda_i = \frac{\mu_i}{\sum_k a_{ik}\omega_k}$$

where $\mu_i$ is a pre-determined value. For example, $\mu_i$ can be set to a fixed value $\mu$, for example $\mu=1$, or alternatively $\mu_i$ can be set equal to the corresponding value of the known basic filter:

$$\mu_i = \sum_k a_{ik}.$$

It has to be noted here that i is equivalent to k if no interpolation is performed by the filtering module 307.

Finally, we get the following approximation of the optimal filter:

$$A_{ap} = \text{Diag}(\lambda_i) A_{basic} \text{Diag}(\omega_k)$$

The output $(\hat{h}_i) = A_{ap}(g_k)$ of the correction module 308 corresponds to the final estimation of the channel values $h_i$. For the simplicity of the description, the $\hat{h}_i$ are renamed $\hat{h}_k$ in the following.

The output $y_k$ of the demodulation module 300, the output $\sigma_k^2$ of the noise power estimation module 302 and the output $\hat{h}_k$ of the correction module 308 are provided to an equalization module 309 which performs an equalization of the demodulated signals. For example, the equalization module 309 implements a MMSE equalization:

$$\hat{x}_k = \frac{\hat{h}_k^H y_k}{|\hat{h}_k^H|^2 + \sigma_k^2}$$

More sophisticated equalization could be performed here, as a sphere decoder, or an equalizer with a priori information in case of turbo-equalization.

According to a particular mode of realization of the present invention, several basic filter matrices are pre-calculated and memorized. One of these basic filters is selected for example according to the estimated noise variances, for example the mean of these variances, or according to the estimation of a significant parameter related to the channel correlation matrix $\Sigma_h$, for example the channel delay spread, or according to both.

A filter selection module 310 selects from the variances provided by the noise power estimation module 302 and/or according to the estimation of a significant parameter related to the channel correlation matrix $\Sigma_h$, for example the channel delay spread, a basic matrix $A_{basic}$ among plural predetermined basic matrices stored in a filter coefficients module 311.

The selected basic matrix is provided to the normalized coefficient module 304 and to the basic filter module 307.

FIG. 4 discloses an example of an algorithm executed by a receiver according to the present invention.

At step S400, the signal received by the receiver Rec is demodulated by a demodulation module 300. For example, the demodulation performs a Discrete Fourier Transform (DFT) of the received signal.

After demodulation, i.e. in the frequency domain, the received signal in the frequency domain can be represented by:

$$y_k = h_k x_k + v_k$$

Where $h_k$ is the channel response for carrier of index k, and where $v_k$ is the additive noise at the same frequency. For example, the term $v_k$ is the addition of the AWGN (thermal) noise and the interferer. Because of the interferer, the variance of the additive noise is frequency-dependent and is denoted by $\sigma_k^2$.

At step S401, a pilot extraction is performed.

The pilot extraction extracts at pilot positions of the demodulated signal, the corresponding received pilot symbols.

At step S402, a rough channel estimation is performed from the extracted pilot symbols.

The rough channel estimation determines a rough estimation $g_k$ of the channel response $h_k$ at each pilot position k like, for example:

$$g_k = \frac{y_k}{p_k}$$

Where k is the pilot index, $y_k$ is the corresponding received symbol and $p_k$ is the sent pilot value at $k^{th}$ position.

It has to be noted here that this estimation is affected by the noise (thermal noise and/or interferers) and only provides estimates at pilot positions.

At step S403, a noise power estimation is performed on the received pilot symbols.

The noise power estimation estimates the variances $\sigma_k^2$ of the additive noise.

The rough channel estimation is modelled as:

$$g_k = h_k + n_k$$

The additive noise $$n_k = \frac{v_k}{p_k}$$

is for example the addition of thermal noise and interference. In the following, and without loss of generality, we assume $E(|p_k|^2) = 1$.

Therefore, the additive noise $n_k$ has the same variance $\sigma_k^2$ as $v_k$: $E(|n_k|^2) = \sigma_k^2$ and is assumed to be centred: $E(n_k) = 0$.

At step S404, a weight coefficients calculation is performed based on the noise power estimation.

The weight coefficients $\omega_k$ are determined as already disclosed.

At step S406, the determined weight coefficients weight the outputs $g_k$ of the rough channel estimation.

At step S407, a filtering is performed on the weighted outputs $\omega_k g_k$ of the rough channel estimation. It uses the $A_{basic}$ matrix for filtering the weighted outputs $\omega_k g_k$.

It has to be noted here that the $A_{basic}$ matrix may provide interpolation i.e. perform interpolations between two symbols or blocks of symbols in order to provide more samples.

At step S409, correction coefficients are determined using the weighting coefficients $\omega_k$.

If some variances $\sigma_k^2$ are high, some weighting coefficients $\omega_k$ may be very low, and the estimates provided by the filtering module 307 have much less energy than the original signal k to be estimated. The correction module 308 compensates it by a further correction step, this depending of the weighting coefficients.

For example, we can multiply each output of index i, where i is the index of the output of the $A_{basic}$ matrix, by:

$$\lambda_i = \frac{\mu_i}{\sum_k a_{ik} \omega_k}$$

where $\mu_i$ is a pre-determined value. For example, $\mu_i$ can be set to a fixed value $\mu$, for example $\mu=1$, or alternatively $\mu_i$ can be set equal to the corresponding value of the known basic filter:

$$\mu_i = \sum_k a_{ik}.$$

It has to be noted here that i is equivalent to k if no interpolation is performed by the filtering.

At step S409, a correction is performed on the output of the filtering module 307.

Finally, we get the following approximation of the optimal filter:

$$A_{ap} = \text{Diag}(\lambda_i) A_{basic} \text{Diag}(\omega_k)$$

The output $(\hat{h}_i) = A_{ap}(g_k)$ of the correction module 308 corresponds to the final estimation of the channel values $h_i$. For the simplicity of the description, the $\hat{h}_i$ are renamed $\hat{h}_k$ in the following.

At step S410, an equalization is performed using the output $y_k$ of the demodulation step, the output $\sigma_k^2$ of the noise power estimation step and the output $\hat{h}_k$ of the correction step. For example, the equalization implements a MMSE equalization:

$$\hat{x}_k = \frac{\hat{h}_k^H y_k}{|\hat{h}_k^H|^2 + \sigma_k^2}$$

More sophisticated equalization could be performed here, as a sphere decoder, or an equalizer with a priori information in case of turbo-equalization.

According to a particular mode of realization of the present invention, several basic filter matrices are pre-calculated and memorized. One of these basic filters is selected at step S405, for example according to the estimated noise variances, for example the mean of these variances, or according to the estimation of a significant parameter related to the channel correlation matrix $\Sigma_h$, for example the channel delay spread, or according to both.

A filter selection step S405 selects from the variances provided by the noise power estimation and/or according to the estimation of a significant parameter related to the channel correlation matrix $\Sigma_h$, for example the channel delay spread, a basic matrix $A_{basic}$ among plural predetermined basic matrices stored in a filter coefficients module 311.

Figure 5:
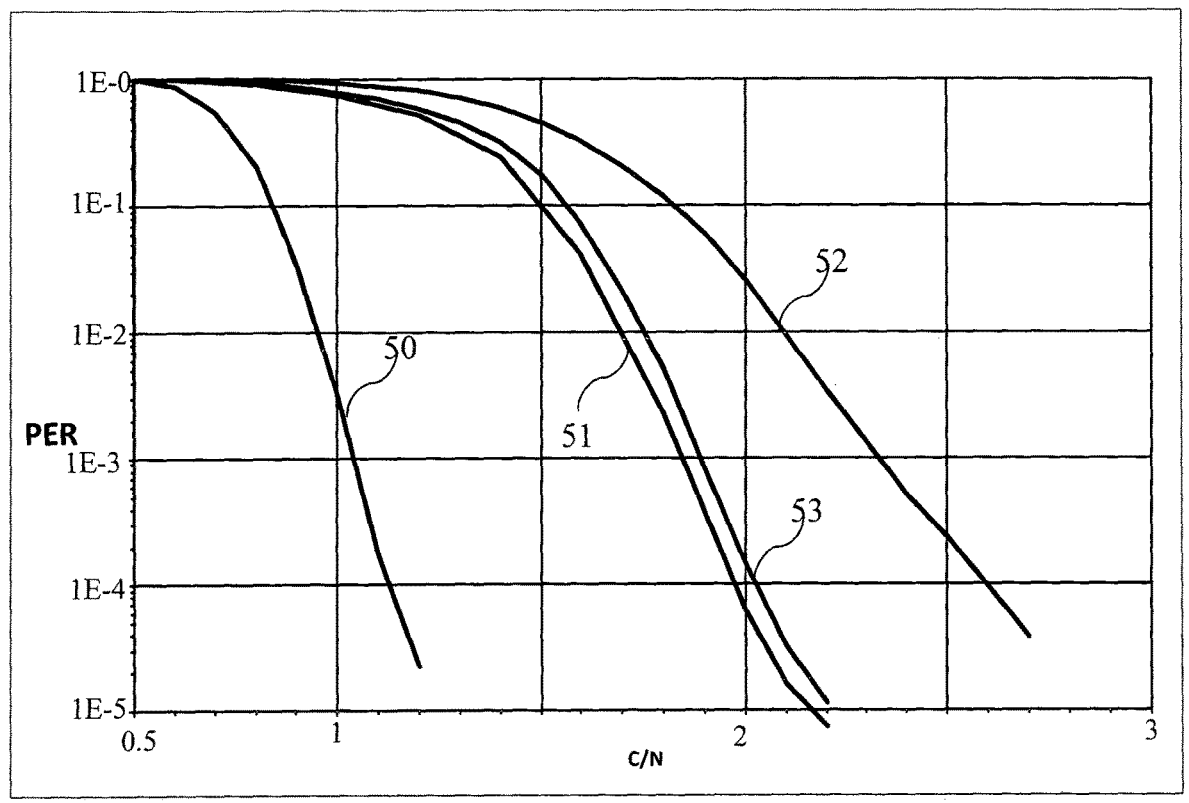
FIG. 5 discloses an example of a Packet Error Rate evolution when the present invention is implemented in the receiver.

FIG. 5 discloses an example of a Packet Error Rate evolution when the present invention is implemented in the receiver.

The horizontal axis represents the carrier to noise ratio and the vertical axis represents the Packet Error Rate.

The curve noted 50 represents an example wherein an optimal channel estimation is performed in a case where no interferer exists.

The curve noted 51 represents an example wherein an optimal channel estimation is performed in a case where interferer exists.

The curve noted 52 represents results in a case where no weighting is performed before the filtering step 407.

The curve noted 53 represents results in a case where weighting is performed before the filtering step 407 and where a normalization step is performed.

Moreover, the gain shall depend on the simulation conditions. With 1 tone and a C/I of −10 dB, applying the proposed scheme, offers a gain of about 0.5 dB with respect to the State of the Art, in these channel conditions. Moreover, as the loss compared to perfect channel estimation is less than 0.1 dB, it implies that the loss compared to the optimal filter calculation would be even lower.

The present invention is disclosed in an example wherein the weighting of the filter inputs is performed by considering basic filter optimised for the MSE criteria. The weighting of the filter inputs can be applied whatever the method used to calculate the basic filters, as long as these basic filters are determined by assuming, explicitly or implicitly, a fixed variance. For example, a filter design based on the frequency response implicitly assumes a fixed variance.

It has to be noted here that the present invention is disclosed in an example wherein the basic matrix or matrices is (are) known in advance. The present invention is also applicable if the basic matrix is recalculated from time to time, at a rate low enough so that the overall complexity is not greatly affected by this computation, and if the interferer variances are supposed to change faster than this low rate.

Naturally, many modifications can be made to the embodiments of the invention described above without departing from the scope of the present invention.

The invention claimed is:

1. Method for performing a channel estimation of a channel between a source and a receiver, a noise with a frequency-dependent variance being added to the stream of symbols received by the receiver from the source through the channel, the receiver performing a demodulation in the frequency domain, characterized in that the method comprises the steps of:
   extracting symbols at pilot positions from the received stream of symbols,
   estimating noise variances at pilot positions,
   determining a rough channel estimation from the symbols extracted at pilot positions,
   determining weighting coefficients from the estimated noise variances,
   weighting the rough channel estimation by the determined weighting coefficients,
   filtering the weighted rough channel estimation using predetermined coefficients, at least one predetermined coefficient being different from the other predetermined coefficients, the predetermined coefficients being determined for a constant noise variance,
   determining normalization coefficients from the determined weighting coefficients and predetermined filter coefficients,
   normalizing the filtered weighted rough channel estimation using the determined normalization coefficients.

2. Method according to claim 1, characterized in that the method further comprises the step of equalizing the channel using the demodulated symbols, the noise power estimation and the normalized filtered weighted rough channel estimation.

3. Method according to claim 1, characterized in that the weighting coefficients are equal to $$\omega_k = \frac{\sigma_b^2}{\sigma_k^2},$$

k is the pilot position index, $\sigma_k^2$ is the noise plus interferer variance for pilot position index k and $\sigma_b^2$ a constant noise variance.

4. Method according to claim 2, characterized in that the weighting coefficients are equal to $$\omega_k = \frac{\sigma_b^2}{\sigma_k^2},$$

k is the pilot position index, $\sigma_k^2$ is the noise plus interferer variance for pilot position index k and $\sigma_b^2$ a constant noise variance.

5. Method according to claim 1, characterized in that the predetermined coefficients $a_{ik}$ are grouped under the form of a predetermined matrix $A_{basic}$ and in that the matrix is determined as:

$$A_{basic} = \left(\sum_h^{-1} + \frac{1}{\sigma_b^2}I\right)^{-1} \frac{1}{\sigma_b^2}$$

where $\Sigma_{()}$ represents the correlation matrix of a channel vector, I is the identity matrix.

6. Method according to claim 2, characterized in that the predetermined coefficients $a_{ik}$ are grouped under the form of a predetermined matrix $A_{basic}$ and in that the matrix is determined as:

$$A_{basic} = \left(\sum_h^{-1} + \frac{1}{\sigma_b^2}I\right)^{-1} \frac{1}{\sigma_b^2}$$

where $\Sigma_{()}$ represents the correlation matrix of a channel vector, I is the identity matrix.

7. Method according to claim 1, characterized in that the normalization coefficients $\lambda_i$ are determined as:

$$\lambda_i = \frac{\mu_i}{\sum_k a_{ik} \omega_k}$$

where i is the index of the i-th output of the filtering and $\mu_i$ is a predetermined value or is the sum of the coefficients $a_{ik}$.

8. Method according to claim 2, characterized in that the normalization coefficients $\lambda_i$ are determined as:

$$\lambda_i = \frac{\mu_i}{\sum_k a_{ik} \omega_k}$$

where i is the index of the i-th output of the filtering and $\mu_i$ is a predetermined value or is the sum of the coefficients $a_{ik}$.

9. Method according to claim 1, characterized in that plural predetermined matrices are memorized and in that the method further comprises the step of selecting one of the plural predetermined matrices according to the estimated noise variances and/or according to the estimation of a parameter related to the correlation matrix $\Sigma_h$ of the channel vector.

10. Method according to claim 2, characterized in that plural predetermined matrices are memorized and in that the method further comprises the step of selecting one of the plural predetermined matrices according to the estimated noise variances and/or according to the estimation of a parameter related to the correlation matrix $\Sigma_h$ of the channel vector.

11. Method according to claim 1, characterized in that the demodulation is an OFDM or SC-FDMA or SC-OFDM demodulation.

12. Method according to claim 2, characterized in that the demodulation is an OFDM or SC-FDMA or SC-OFDM demodulation.

13. Device for performing a channel estimation of a channel between a source and a receiver, a noise with a frequency-dependent variance being added to the stream of symbols received by the receiver from the source through the channel, the receiver performing a demodulation in the frequency domain, characterized in that the device comprises:
    means for extracting symbols at pilot positions from the received stream of symbols,
    means for estimating noise variances at pilot positions,
    means for determining a rough channel estimation from the symbols extracted at pilot positions,
    means for determining weighting coefficients from the estimated noise variances,
    means for weighting the rough channel estimation by the determined weighting coefficients,
    means for filtering the weighted rough channel estimation using predetermined coefficients, at least one predetermined coefficient being different from the other predetermined coefficients, the predetermined coefficients being determined for a constant noise variance,
    means for determining normalization coefficients from the determined weighting coefficients and predetermined filter coefficients,
    means for normalizing the filtered weighted rough channel estimation using the determined normalization coefficients.

* * * * *